United States Patent [19]

Fitch

[11] Patent Number: 5,353,429
[45] Date of Patent: Oct. 4, 1994

[54] CACHE MEMORY SYSTEMS THAT ACCESSES MAIN MEMORY WITHOUT WAIT STATES DURING CACHE MISSES, USING A STATE MACHINE AND ADDRESS LATCH IN THE MEMORY CONTROLLER

[75] Inventor: Jonathan M. Fitch, Cupertino, Calif.

[73] Assignee: Apple Computer, Inc., Cupertino, Calif.

[21] Appl. No.: 109,694

[22] Filed: Aug. 20, 1993

Related U.S. Application Data

[63] Continuation of Ser. No. 670,697, Mar. 18, 1991, abandoned.

[51] Int. Cl.[5] ............................................. G06F 12/00
[52] U.S. Cl. ................................. 395/425; 395/400; 364/238.4; 364/243.41
[58] Field of Search ........................... 395/400, 425; 364/200 MS File, 900 MS File

[56] References Cited

U.S. PATENT DOCUMENTS

| | | | |
|---|---|---|---|
| 4,669,043 | 5/1987 | Kaplinsky | 395/425 |
| 4,831,520 | 5/1989 | Rubinfeld et al. | 395/325 |
| 5,091,845 | 2/1992 | Rubinfeld | 395/425 |
| 5,157,774 | 10/1992 | Culley | 395/425 |
| 5,159,676 | 10/1992 | Wicklund et al. | 395/425 |

Primary Examiner—Joseph L. Dixon
Assistant Examiner—Frank J. Asta
Attorney, Agent, or Firm—Blakely, Sokoloff, Taylor & Zafman

[57] ABSTRACT

A memory system where a cache miss is fielded with a retry access to main memory, but instead of waiting for the microprocessor to resynchronize and re-initiate the memory cycle, the memory cycle is started immediately. The speed of the tag array is specified so that the status of the cache, hit or miss, is known at the same time that the microprocessor's memory cycle start signal is known to be valid. The addresses are then latched and the memory cycle is started in anticipation of the retried cycle. The access time of memory is then overlapped with microprocessor resynchronization and memory cycle reinitialization. By using this technique, clock cycles are needed for the initial cycle, additional clock cycles are needed to perform the resynchronization, and additional clock cycles are needed for the retried cycle since the data is already waiting from memory. The above-described improvement is implemented by decoupling the direct connection of the memory array from the address bus. Additionally, a state machine modifies the operation of the memory controller so that the access time of the memory is overlapped with microprocessor resynchronization and memory cycle reinitialization.

5 Claims, 5 Drawing Sheets

CACHE MEMORY SYSTEMS THAT ACCESSES MAIN MEMORY WITHOUT WAIT STATES DURING CACHE MISSES, USING A STATE MACHINE AND ADDRESS LATCH IN THE MEMORY CONTROLLER

This is a continuation of application Ser. No. 07/670,697 filed Mar. 18, 1991, abandoned.

SUMMARY OF THE INVENTION

A memory architecture including a memory cache is disclosed which eliminates the miss penalty normally associated with caches by overlapping wasted processor cycles due to overhead such as wait cycles which occur after cache misses with main memory access cycles.

Memory caches are used by high performance computer systems to improve the effective speed of memory at a lower cost than faster memory itself. The improved performance is accomplished by storing a small amount of instructions or data in a small but fast RAM array (the cache). Algorithms are used to ensure that the data in the cache are likely to be the next data needed by the processor. If the processor needs data that is not resident in the cache, it accesses a slower but much larger main memory array. The data fetched from the main memory then replaces some of the data in the cache with the expectation that it will be needed again soon. Properly implemented, the rate at which data is found in the cache (called the 'hit rate') can be in excess of 90% of all accesses. Thus, if the cache access time is much faster than main memory, this is the access time that will be seen for 90% of the bus cycles resulting in an effective memory access time which is faster than that which could be obtained by always accessing the main memory directly.

There are various techniques for fetching the data from main memory on those accesses that miss the cache. Usually these involve a time penalty over and above the access time that could have been achieved, had an access into the cache not been tried first (called the 'miss penalty'). This time penalty is accepted with the hope that the extra performance achieved with cache hits exceeds that lost for misses. Usually a degenerate case can be found where the hit rate in the cache is very low due to the particular arrangement of instructions or data. If this happens in a system with a significant cache miss penalty, the performance will actually be lower than a system without a cache.

In the memory system of the present invention, like in the prior art, a cache miss is fielded with a retry access to main memory. However, instead of waiting for the microprocessor to resynchronize and re-initiate the memory cycle, the memory cycle is started immediately. The speed of the tag array (which includes the circuit which differentiates cache misses from cache hits) is specified so that the status of the cache, hit or miss, is known at the same time that the microprocessor's memory cycle start signal is known to be valid. The addresses are then latched (since, otherwise, they will vanish with the retry), and the memory cycle is started in anticipation of the retried cycle. The access time of memory is then overlapped with microprocessor resynchronization and memory cycle reinitialization. By using this technique, clock cycles are needed for the initial cycle, additional clock cycles are needed to perform the resynchronization, and additional clock cycles are needed for the retried cycle since the data is already waiting from memory. For a typical processor, typically, a total of six such additional clock cycles are needed which is the same as an uncached system and 40% faster than a typical cached system miss. Thus, the miss penalty has disappeared, and in the worst case, memory accesses are no slower than in an uncached system.

The present invention implements the above-described improvement by decoupling the direct connection of the memory array from the address bus. Additionally, the present invention uses a state machine which modifies the operation of the memory controller so that the access time of RAM array is overlapped with microprocessor resynchronization and memory cycle reinitialization.

DETAILED DESCRIPTION OF THE INVENTION

Figure 1:
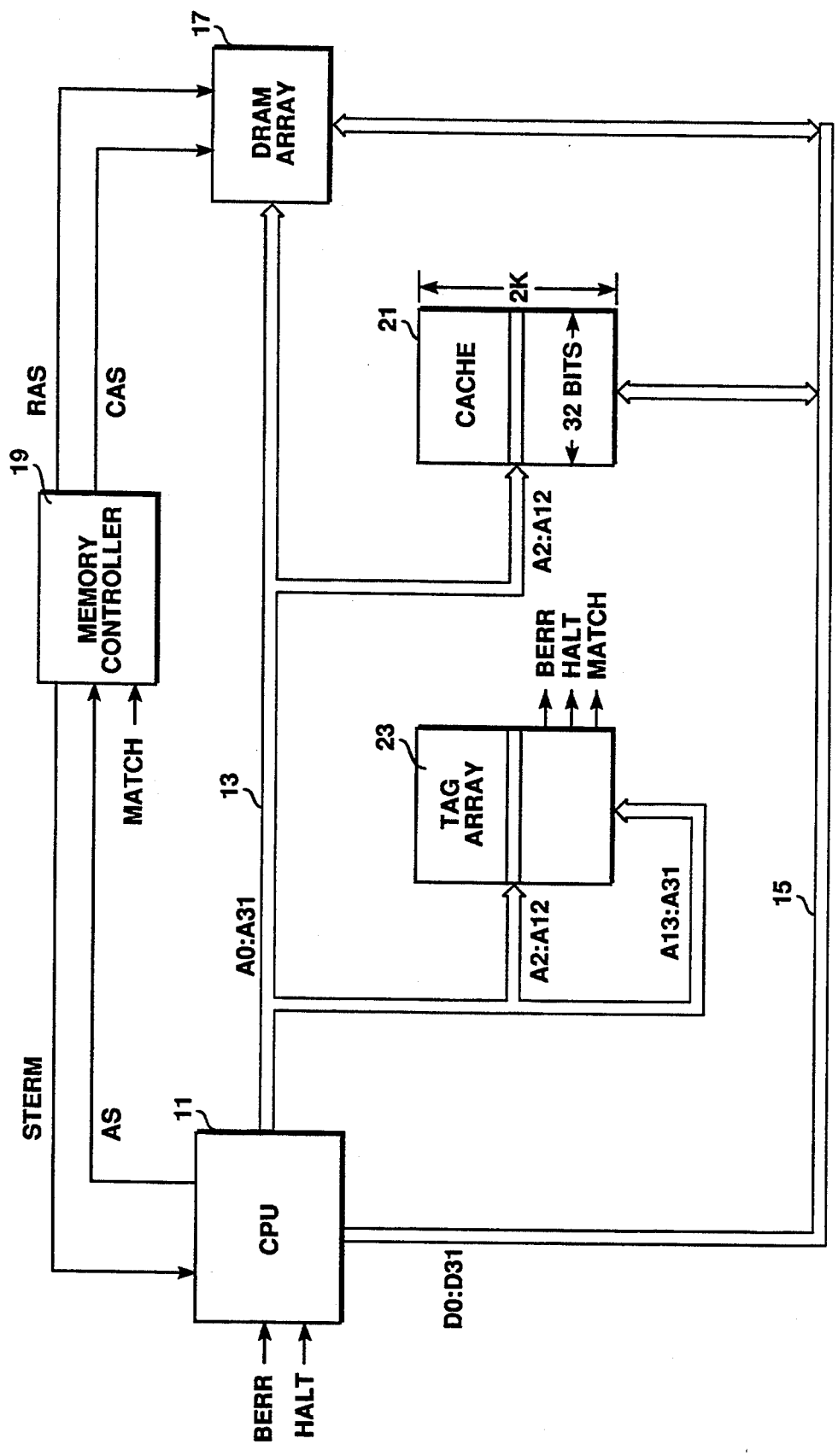
FIG. 1 is a block level diagram of a prior art memory system with a write through cache.

FIG. 1 shows a typical prior art memory cache architecture comprising a CPU 11 having an address bus 13, data bus 15 for accessing a random access memory, i.e., DRAM array 17. Data on data bus 15 is written to memory 17, or data from memory 17 is read and placed onto bus 15 using the address on the address bus 13 under control of memory controller 19 which generates row address strobe (RAS) signals and column address strobe (CAS) signals in accordance with techniques well known in the art. Cache memory systems can be split into two general categories: 1) write-through and 2) copy-back. In the write-through scheme, data is always written to memory simultaneously with updating the cache to the new data contents. This eliminates the possibility of cache incoherency, a situation in which the contents of memory and cache differ for the same address. The disadvantage of this technique is that writing speed is determined by memory speed, not cache speed, negating some of the performance advantage of a memory cache.

FIG. 1 shows a typical write through cache architecture comprising cache 21 and tag array 23 wherein for a 2K cache, cache 21 is addressed by bits A2:A12 on the 32 bit (A0:A31) address bus, and cache hits and misses are determined using tag array 23 which stores the high order A13:A31 bits from the address bus. The tag array asserts the signal Match when the address on the address bus (except possibly for the low order bits A0:A1 which determine only one of four bytes in a 32 bit word) matches the data in the tag array pointed to by bits A2:A12 of the address on the address bus. The signals Berr and Halt are signals generated by tag array 23 in accordance with the requirements of the Motorola 68xxx family of microprocessors which use a memory cache as defined in specifications available from Motorola Corporation and should be familiar to persons skilled in the field of the invention. In this connection, the details concerning the generation and use of these signals, other details of a memory cache architecture which are not shown in FIG. 1, and details for implementing memory controller 19 will be readily apparent to persons skilled in the art and will be described herein only to the extent needed for a complete understanding of the present invention. Further, FIG. 1 is provided only as a reference to show changes made to a prior art memory architecture using a memory cache to implement the present invention.

Many microprocessors require very fast acknowledgement of external memory references for fastest operation. In particular, the time allowed between a memory address first appearing on the address bus and assertion of a memory cycle termination signal is small. Failure of the memory system to acknowledge the cycle quickly by asserting the memory cycle termination signal in time will result in the insertion of CPU wait states. In a system with a memory cache, the tag array must be accessed prior to terminating the memory cycle to see if the cache contains the location being addressed. Because of this, microprocessors typically allow the assertion of a "retry" signal somewhat later than the memory cycle termination signal if the memory address is not in the tag array. The retry signal causes the microprocessor to throw away the data that it has received and begin another memory cycle identical to the first. Normal operation therefore consists of acknowledging the initial memory cycle regardless of the contents of the tag, and then retrying the cycle if the cache contents are invalid for this address. On the retried cycle, a memory cycle is initiated to the main memory array.

The Motorola 68030, for example, requires the memory cycle termination signal (STERM) to be valid prior to the address strobe signal indicating the beginning of the memory cycle (AS). For the 68030 to operate with no wait states requires that STERM be asserted at any time that a memory cycle might start so that it will be recognized in time. Therefore, cache misses are commonly fielded by terminating the bus cycle with the signals Berr and Halt asserted together causing the processor to end its memory cycle, resynchronize its instructions pipeline, and start the retry memory cycle.

In many microprocessor architectures, the AS or equivalent signal is asserted by the microprocessor to cause the memory system to commence a memory cycle. For clocked memory chips such as DRAMs, it is imprudent to start a memory cycle prior to the assertion of this signal even if the address on the address bus is known to be stable. This is because of the recovery time required once a cycle has started. Specifically, if the data is unneeded, the microprocessor is likely to be delayed in starting the next memory cycle for data which will actually be used, waiting for the memory to recover from the false start.

The combination of these constraints results in a substantial miss penalty for normal architectures where, as is usually the case, the main memory is a DRAM array. As an example, for a 68030 microprocessor the initial bus cycle for a memory access will take a minimum of two clock cycles. If there is a cache miss, the bus cycle is terminated as a retry which then causes a two clock cycle resynchronization. Then the retried memory cycle is initiated which could take six clock cycles for typical microprocessor and memory speeds. This is a total of 10 clock cycles verses the two clock cycles for a cache hit and six clock cycles needed for a memory system which does not use a memory cache.

In the memory system of the present invention, like in the prior art, a cache miss is fielded with a retry access to main memory. However, instead of waiting for the microprocessor to resynchronize and re-initiate the memory cycle, the memory cycle is started immediately. The speed of the tag array 23 (which includes the circuit which differentiates cache misses from cache hits) is specified so that the status of the cache, hit or miss, is known at the same time that the microprocessor's memory cycle start signal is known to be valid. As noted above, this is as early as is prudent to start a memory cycle in any case. The addresses are then latched (since, otherwise, they will vanish with the retry), and the memory cycle is started in anticipation of the retried cycle. The access time of memory is then overlapped with microprocessor resynchronization and memory cycle reinitialization. By using this technique, two clock cycles are needed for the initial cycle, two clock cycles are needed to perform the resynchronization, and two clock cycles are needed for the retried cycle since the data is already waiting from memory. This is a total of six clock cycles which is the same as an uncached system and 40% faster than a typical cached system miss. Thus, the miss penalty has disappeared, and in the worst case, memory accesses are no slower than in an uncached system.

Figure 2:
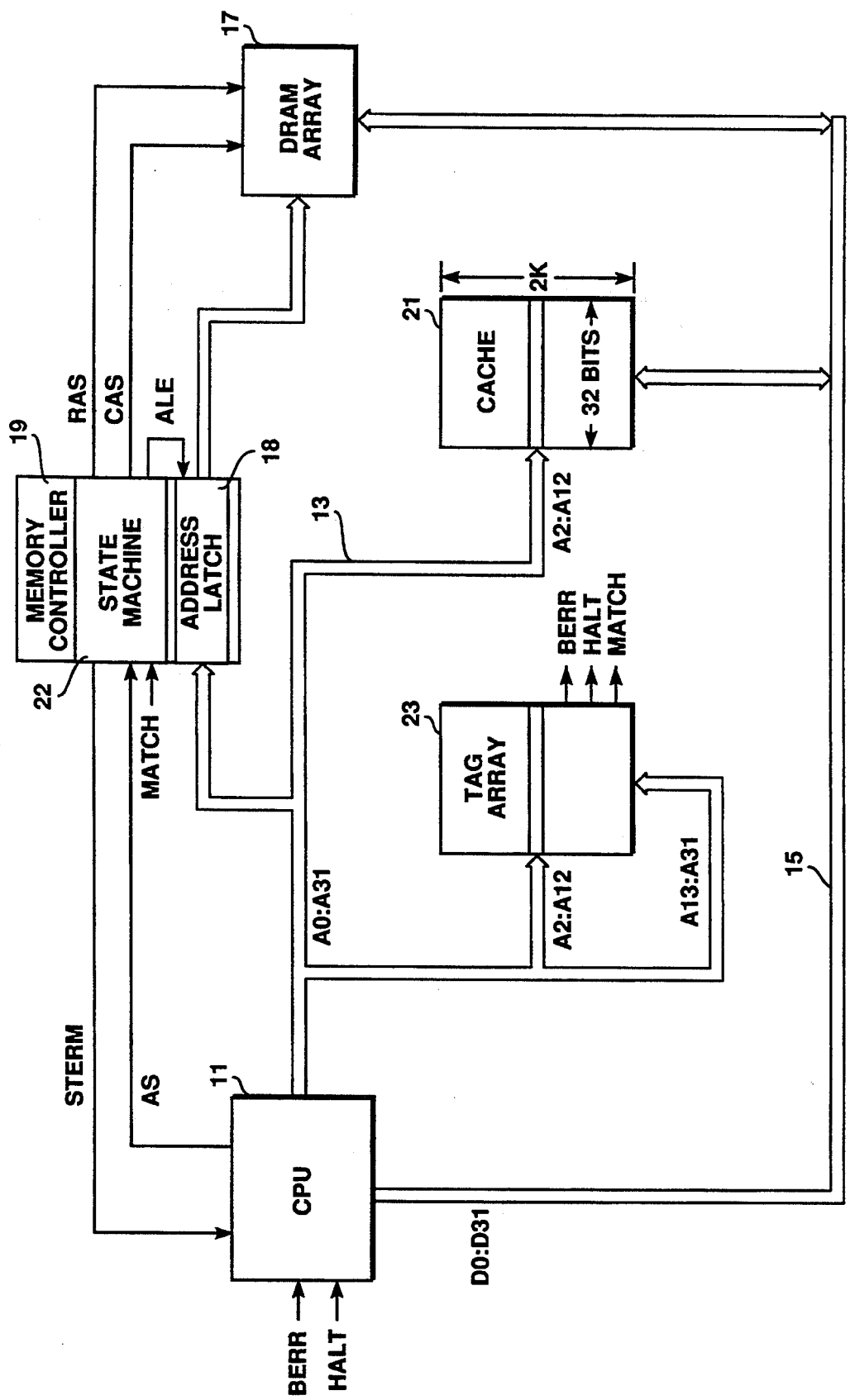
FIG. 2 is a block level diagram of a memory system according to the present invention.

The present invention implements the above-described improvement by decoupling the direct connection of the memory array from the address bus. In particular, and with reference to FIG. 2, address bus 13 is input to an address latch 18 of memory controller 19 coupled to main memory, i.e., DRAM array 17. Additionally, the present invention uses a state machine 22 which modifies the operation of the memory controller so that the access time of DRAM array 17 is overlapped with microprocessor resynchronization and memory cycle reinitialization.

Figure 3:
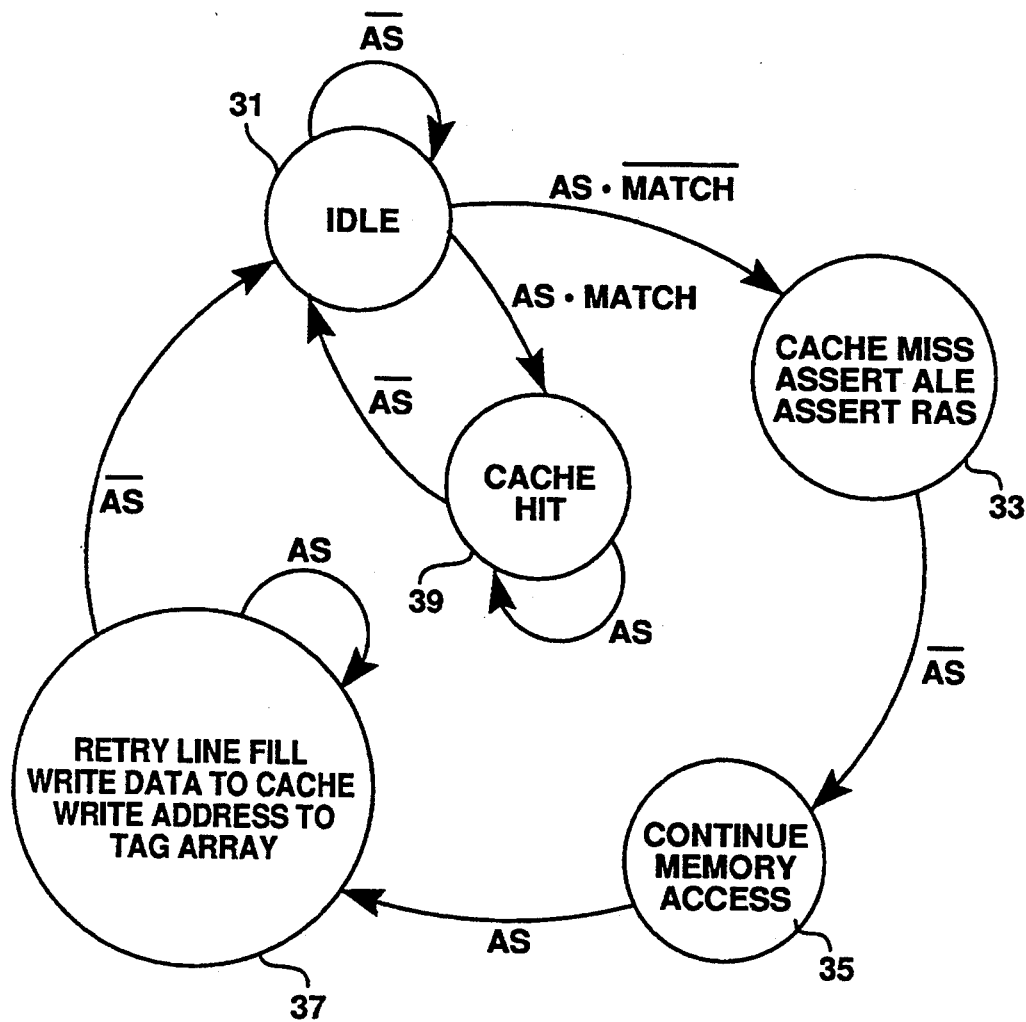
FIG. 3 is a state machine diagram for the state machine of the memory controller of the present invention.

FIG. 3 is a state machine diagram of state machine 22 for controlling the operation of memory controller 19 in accordance with the present invention. In this connection, the state machine of FIG. 3 assumes a Motorola 68030 microprocessor with the state machine clocked on the falling edge of the microprocessor clock. The memory cycle is terminated by decoding of the address on the address bus and asserting STERM asynchronously. The Berr/Halt signals are generated asynchronously by logic in the tag array 23 and are equivalent to $\overline{\text{MATCH}}$ indicating a cache miss.

As shown in FIG. 3, the state machine remains in the idle state 31 until the signal indicating the beginning of the memory cycle (AS) is asserted. If AS and $\overline{\text{MATCH}}$ are asserted (i.e., there is no match between the address on the address bus and an address in tag array 23), there is a cache miss and the address latch enable signal (ALE) is asserted latching the address on address bus 13 into latch 18, the signal RAS is asserted and the data is obtained from main memory i.e., DRAM array 17 (cache miss state 33). In this case, during the next state (continue memory access state 35), the memory access is continued and completed. After the memory access has been completed, the next state (retry line fill state 37) is used to write the retrieved data to the cache 21 and the address to tag array 23.

Of course, when AS and MATCH are asserted, the state machine causes cache hit processing to be performed (cache hit state 39) until the CPU deasserts AS at which time the state machine goes back in to the idle state waiting for the next address strobe signal AS to be generated by the CPU.

Figure 4:
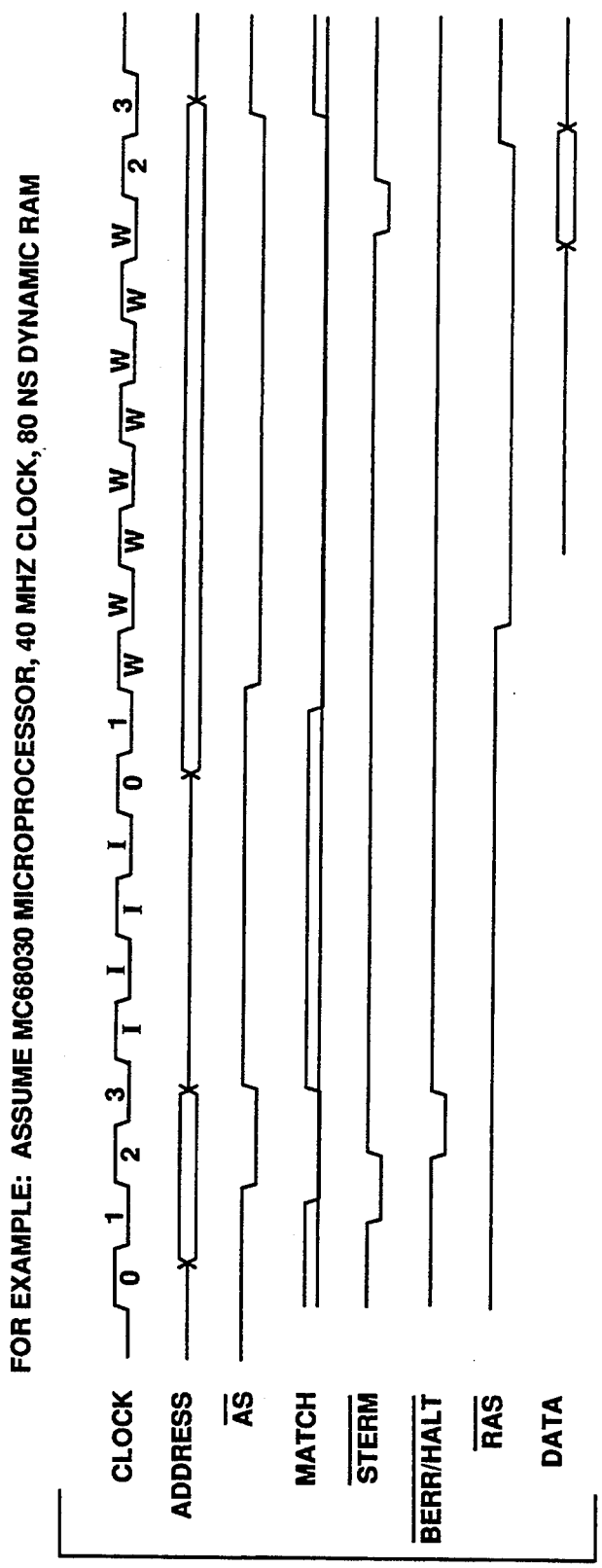
FIG. 4 is a timing diagram for a prior art cache memory system.
Figure 5:
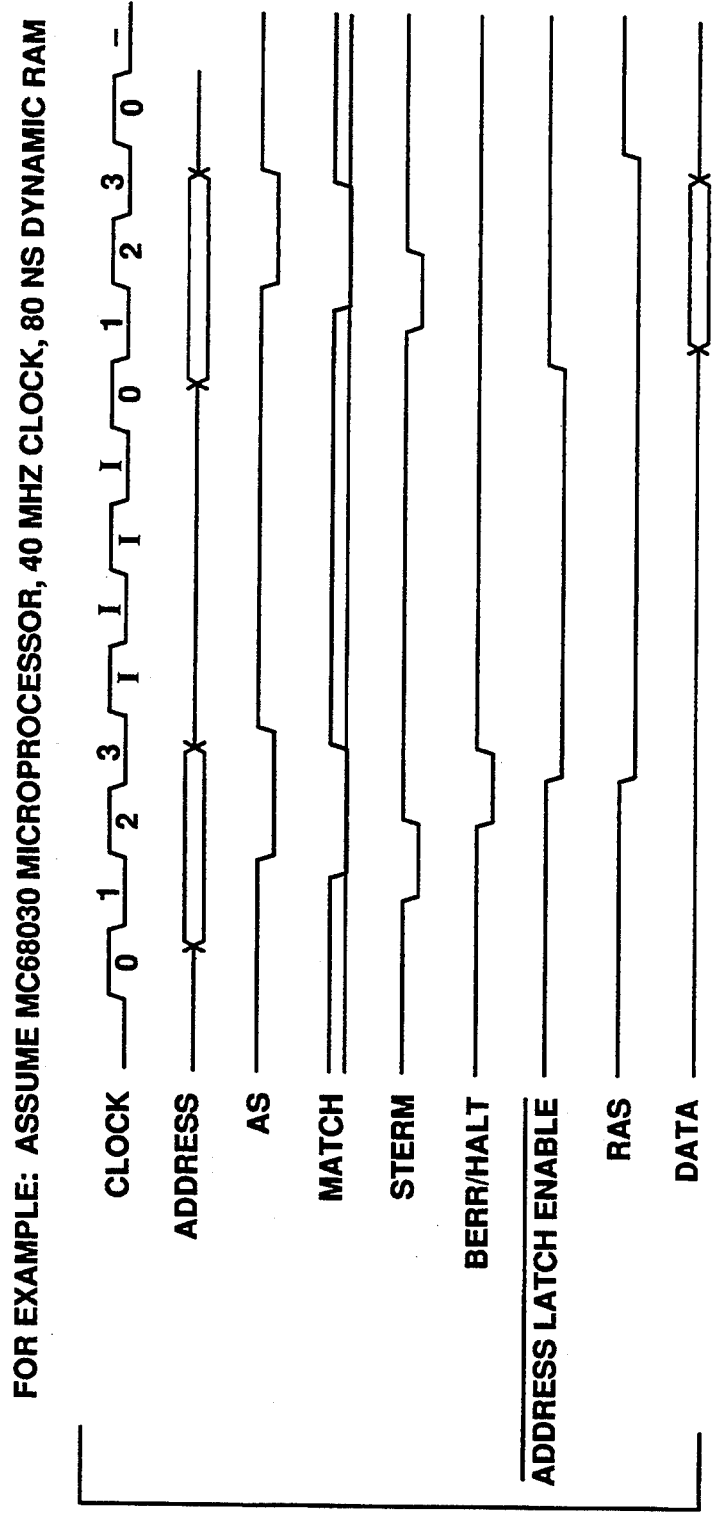
FIG. 5 is a timing diagram of the cache memory system of the present invention.

The advantages of the present invention over the prior art can be seen in FIGS. 4 and 5 which both assume a Motorola 68030 microprocessor with a 40 MHz clock and 80 ns dynamic RAM for the case of a cache miss. In this connection, as shown in FIG. 5, which is a timing diagram for the present invention, the data becomes valid four clock cycles after a cache miss as compared to eight clock cycles for the prior art whose timing diagram is shown in FIG. 4.

I claim:

1. A computer system including a cache memory system comprising:
    a) a central processing unit coupled to a data bus and an address bus;
    b) a main memory having a predetermined access time coupled to said data bus and to an address latch bus, said main memory for storing data and instructions for use by said central processing unit;
    c) a memory controller means for controlling accesses to said main memory, said memory controller means including i) an address latch coupled to said address bus and said address latch bus, and ii) state machine means for controlling the operation of the memory controller means and the address latch;
    d) a cache memory means coupled to said address bus and said data bus for storing a predetermined subset of said data and instructions for use by said central processing unit;
    e) a cache tag array means coupled to said address bus for storing portions of addresses from said address bus corresponding to addresses of data and instructions stored in said cache memory means and for generating signals indicating for an address on said address bus whether data corresponding to the address on the address bus is stored within said cache memory means, such that if said data corresponding to the address on the address bus is not stored within said cache memory means, said state machine operates to cause the access time of said main memory to be overlapped with resynchronization of said central processing unit and memory cycle reinitialization required to obtain the data from said main memory.

2. The computer system defined by claim 1 wherein said state machine means includes a first loop with an idle state, a cache miss state, a continue memory access state and a retry line fill state, and a second loop with said idle state and a cache hit state, and addresses within said address latch are placed onto said address latch bus only during said cache miss state.

3. The computer system defined by claim 2 wherein said state machine generates an address latch enable signal during said cache miss state which causes an address on said address bus to be latched by said address latch.

4. The computer system defined by claim 2 wherein during said retry line fill state, data on said data bus is written to said cache memory means and a predetermined portion of the address on said address bus is written to said cache tag array means.

5. In a computer system including a cache memory, a central processing unit coupled to a data bus and an address bus, a main memory having a predetermined access time coupled to said data bus and to an address latch bus, said main memory for storing data and instructions for use by said central processing unit, a memory controller for controlling accesses to said main memory, said memory controller including i) an address latch coupled to said address bus and said address latch bus, and ii) a state machine for controlling the operation of the memory controller and the address latch, a method for improving performance of said computer system during read operations comprising the steps of:
    a) storing a predetermined subset of said data and instructions for use by said central processing unit in said cache memory;
    b) storing portions of addresses from said address bus corresponding to addresses of data and instructions stored in said cache memory;
    c) generating signals indicating for an address on said address bus whether data corresponding to the address on the address bus is stored within said cache memory;
    d) wherein if said data corresponding to the address on the address bus is not stored within said cache memory, said state machine operating to cause the access time of said main memory to be overlapped with resynchronization of said central processing unit and memory cycle reinitialization required to obtain the data from said main memory.

* * * * *